P. BROWN AND F. J. BOSTOCK.
WORM GEARING.
APPLICATION FILED SEPT. 18, 1919.

1,349,811. Patented Aug. 17, 1920.

Inventors:
Percy Brown and F. J. Bostock
by Herbert W. Jenner.
Attorney.

UNITED STATES PATENT OFFICE.

PERCY BROWN AND FRANCIS JOHN BOSTOCK, OF HUDDERSFIELD, ENGLAND.

WORM-GEARING.

1,349,811.   Specification of Letters Patent.   Patented Aug. 17, 1920.

Application filed September 18, 1919. Serial No. 324,549.

*To all whom it may concern:*

Be it known that we, PERCY BROWN and FRANCIS JOHN BOSTOCK, subjects of King George V of Great Britain, residing at Huddersfield, in the county of York, England, have invented a new and useful Improvement in Worm-Gearing, of which the following is a specification.

This invention relating to worm gearing comprises an improved construction or formation of the thread of the worm, or of the shape thereof, and has for its object the obtaining of an improvement of the contact between the worm thread and the tooth of the worm wheel, one of the features of the improved construction or shape of thread being the elimination of a large portion of the usual sliding and rubbing contact found in this type of gear, and replacement of same by a rolling action between the surfaces of the worm and worm wheel while in engagement with each other.

It is usual in ordinary worm gears for the sides of the worm threads upon a linear section, that is to say, a section obtained by a plane containing the axis, to be made straight at a predetermined angle. Such formation, however, gives a worm whose motion is transmitted to the worm wheel by sliding action similar to that of movement along an inclined plane or wedge. In order to obtain an increased load carrying capacity, there have been, of course, other forms or types of straight line worm threads in which the straight line portion is on a plane not containing the axis of the worm, but lying at a predetermined distance therefrom.

In the improved construction or shape of thread embodying our invention, we so form the sides of the thread that the motion from the worm to the wheel is mainly that of a rolling action whereby we obtain a worm capable of giving increased efficiency.

Our invention consists therefore in so forming the worm on the linear section that its shape is hyperbolic.

The object and nature of the invention thus set forth will appear more fully from the accompanying description and drawings and will be particularly pointed out in the claims.

Figure 1:
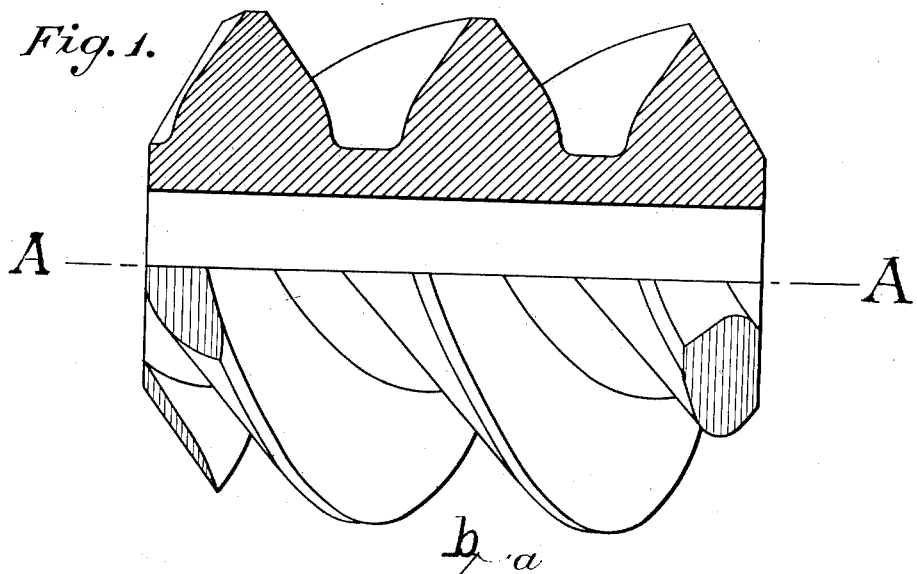
Figure 2:
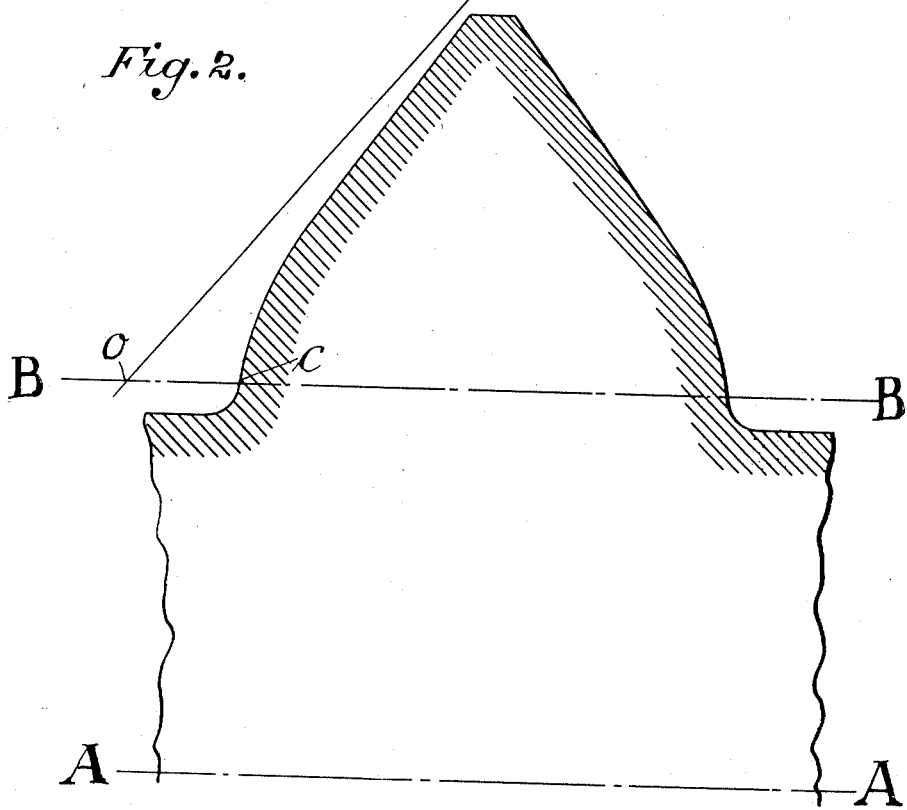

Figure 1 is an elevation, partly in section taken on a plane containing the worm axis, of a worm constructed according to our invention, and Fig. 2 is an enlarged transverse section of the worm thread.

Referring to the drawing, A, A represent the axis of the worm and B, B the root or bottom diameter of the thread. Although not necessary for our invention B, B can suitably be made the axis of the hyperbola, the vertex of which is at the point $a$.

The formation of the hyperbola which constitutes either side of the thread is controlled or determined by its asymtote $o$, $b$ which intersects the line B, B at the point $o$ situated at a suitable distance from the point $c$. The angle which the asymtote makes to the axis B, B is preferably made approximately equal to the angle that the worm thread on the cylinder of the root diameter makes with the worm axis.

The thread of the worm can be cut in any of the ordinary machines now employed in the cutting of worms, or it can be cut in the lathe by employing a tool whose shape is identical to the required hyperbolic curve, and the worm wheel can also be cut in the usual way by means of a hob made to correspond with the worm.

Having thus described our invention, what we claim as new and desire to secure by Letters Patent is:—

1. A worm having its thread so formed that the sides of said thread, upon a section obtained by a plane containing the axis, are portions of hyperbolas, substantially as herein shown and described and for the purpose set forth.

2. A worm provided with a spiral thread the driving face of side portion of which, upon a section obtained by a plane containing the axis of the worm, is a portion of a hyperbola.

3. A worm having a thread with a working surface shaped on its linear section like a hyperbola having an asymtote making an angle with the axis of the worm approximately equal to the angle of lead of the worm at the root diameter.

4. A worm having a thread with a working surface shaped on its linear section like a hyperbola having an asymtote making an angle with the axis of the worm having a definite relationship to the angle of lead of the worm at the root diameter.

5. A worm the thread or teeth of which have working faces which form portions of hyperbolas in the plane of the axis of the worm and having their vertices lying approximately on the cylinder of the root diameter of the thread.

In testimony whereof we affix our signatures in the presence of two witnesses.

PERCY BROWN.
FRANCIS JOHN BOSTOCK.

Witnesses:
CECIL SENIOR,
LEONARD GIBSON SINBURN.